(12) United States Patent
Dolezilek et al.

(10) Patent No.: US 12,334,977 B2
(45) Date of Patent: Jun. 17, 2025

(54) FIBER OPTIC SIGNAL MONITORING

(71) Applicant: Schweitzer Engineering Laboratories, Inc., Pullman, WA (US)

(72) Inventors: David J. Dolezilek, Pullman, WA (US); Mauricio G. Silveira, Pullman, WA (US); Bharat Nalla, Ashburn, VA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 108 days.

(21) Appl. No.: 18/067,847

(22) Filed: Dec. 19, 2022

(65) Prior Publication Data

US 2024/0204868 A1    Jun. 20, 2024

(51) Int. Cl.
*H04B 10/079*    (2013.01)
*G08B 21/18*    (2006.01)

(52) U.S. Cl.
CPC ..... *H04B 10/07955* (2013.01); *G08B 21/182* (2013.01)

(58) Field of Classification Search
CPC ......................... H04B 10/07955; G08B 21/182
See application file for complete search history.

(56) References Cited

U.S. PATENT DOCUMENTS

| | | | |
|---|---|---|---|
| 3,532,158 A | 10/1970 | Hiebert | |
| 5,752,011 A | 5/1998 | Thomas | |
| 5,767,999 A | 6/1998 | Kayner | |
| 6,188,494 B1 | 2/2001 | Minteer | |
| 6,431,765 B1 | 8/2002 | Chen | |
| 6,526,113 B1 | 2/2003 | Gutierrez | |
| 6,570,768 B2 | 5/2003 | Medina | |
| 6,634,803 B2 | 10/2003 | Brezina | |
| 6,667,883 B1 | 12/2003 | Solis | |
| 6,748,041 B1 | 6/2004 | Gutierrez | |
| 6,752,663 B2 | 6/2004 | Bright | |
| 6,804,116 B2 | 10/2004 | Owens | |
| 6,816,376 B2 | 11/2004 | Bright | |
| 6,822,860 B2 | 11/2004 | Owens | |
| 6,868,219 B2 | 3/2005 | Lipski | |

(Continued)

FOREIGN PATENT DOCUMENTS

| | | |
|---|---|---|
| JP | 58023500 | 8/1981 |
| WO | 2006069173 | 4/2009 |

*Primary Examiner* — Pranesh K Barua
(74) *Attorney, Agent, or Firm* — Jared L. Cherry

(57) ABSTRACT

A fiber optic communication system may include a transmitting subsystem, a receiving subsystem, a power monitoring subsystem, a temperature monitoring subsystem, an alarm subsystem, and a data logging subsystem. The transmitting subsystem may be configured to transmit optical signals encoding data into an optical path. The receiving subsystem may be configured to receive the optical signals transmitted by the transmitting subsystem and decode the data encoded in the optical signal. The power monitoring subsystem may be configured to measure a power of the optical signal during normal operations. The temperature monitoring subsystem may monitor the temperature of the fiber optic communication system at various locations. The alarm subsystem may generate an alarm if the system operates outside of certain thresholds. The data logging subsystem may log the measured temperatures and optical signal power of the fiber optic communication system.

14 Claims, 3 Drawing Sheets

(56) References Cited

U.S. PATENT DOCUMENTS

| | | |
|---|---|---|
| 6,973,230 B1 | 12/2005 | Mackay |
| 7,001,217 B2 | 2/2006 | Bright |
| 7,111,465 B2 | 9/2006 | Bell |
| 7,313,500 B2 | 12/2007 | Morman |
| 7,630,632 B2 | 12/2009 | Dolfi |
| 7,637,672 B1 | 12/2009 | Li |
| 7,723,760 B2 | 5/2010 | Henderson |
| 7,898,808 B2 | 3/2011 | Joiner |
| 8,175,462 B2 | 5/2012 | Wong |
| 8,339,784 B2 | 12/2012 | Pirillis |
| 8,358,504 B2 | 1/2013 | McColloch |
| 8,581,169 B2 * | 11/2013 | Banhegyesi ..... H04B 10/25891 398/58 |
| 9,042,096 B2 | 5/2015 | Thomas |
| 9,235,017 B1 | 1/2016 | Meadowcroft |
| 10,659,168 B2 | 5/2020 | Rector |
| 2002/0009905 A1 | 1/2002 | Poplawski |
| 2002/0114141 A1 | 8/2002 | Medina |
| 2002/0118424 A1 * | 8/2002 | Miki ................. H04B 10/564 398/192 |
| 2003/0128411 A1 * | 7/2003 | Aronson ............. G01M 11/00 398/139 |
| 2003/0161108 A1 | 8/2003 | Bright |
| 2004/0047564 A1 | 3/2004 | Chiu |
| 2004/0190669 A1 | 9/2004 | Gutierrez |
| 2004/0208207 A1 | 10/2004 | Kasper |
| 2005/0213982 A1 | 9/2005 | Weber |
| 2006/0037589 A1 | 2/2006 | Gupta |
| 2006/0159460 A1 * | 7/2006 | Stewart ........... H04B 10/07955 398/135 |
| 2006/0193099 A1 * | 8/2006 | Schweitzer ......... H02H 1/0061 361/115 |
| 2007/0033425 A1 | 2/2007 | Clark |
| 2007/0183776 A1 * | 8/2007 | Stuart .................. H04B 10/077 398/38 |
| 2007/0193872 A1 | 8/2007 | Garcia |
| 2007/0280695 A1 | 12/2007 | Li |
| 2009/0196008 A1 | 8/2009 | McColloch |
| 2009/0279218 A1 | 11/2009 | Ferru |
| 2009/0279897 A1 * | 11/2009 | Takeuchi ......... H04B 10/07955 398/137 |
| 2010/0091747 A1 | 4/2010 | Dorsey |
| 2010/0155033 A1 | 6/2010 | Holley |
| 2010/0172652 A1 | 7/2010 | Wong |
| 2010/0238045 A1 * | 9/2010 | Feight ................ H04B 10/1141 340/815.45 |
| 2011/0135316 A1 | 6/2011 | Fankhauser |
| 2011/0164382 A1 | 7/2011 | Pirillis |
| 2011/0317348 A1 | 12/2011 | Pratt |
| 2012/0058670 A1 | 3/2012 | Regnier |
| 2012/0182688 A1 | 7/2012 | McColloch |
| 2012/0251100 A1 * | 10/2012 | Rope .................... H04B 10/40 398/25 |
| 2013/0000871 A1 | 1/2013 | Olson |
| 2013/0322500 A1 | 12/2013 | Gammel |
| 2013/0336650 A1 | 12/2013 | Azadeh |
| 2014/0095191 A1 * | 4/2014 | Kabbani ................ G16H 40/67 705/2 |
| 2015/0008938 A1 * | 1/2015 | Kim ........................ H04L 27/02 324/543 |
| 2015/0243155 A1 * | 8/2015 | Xiong .................. G08B 21/182 398/135 |
| 2016/0173203 A1 * | 6/2016 | Feng ..................... H04B 10/572 398/140 |
| 2018/0212700 A1 * | 7/2018 | Magri .................... H04J 14/029 |
| 2022/0236312 A1 * | 7/2022 | Yogeeswaran ....... H04B 10/071 |

* cited by examiner

FIBER OPTIC SIGNAL MONITORING

TECHNICAL FIELD

This disclosure relates to systems, devices, and methods for monitoring fiber optic signals and devices. More particularly, but not exclusively, this disclosure relates to electronic devices that may regularly monitor fiber optic signals and devices during normal operations and identify anomalies.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

Figure 1:
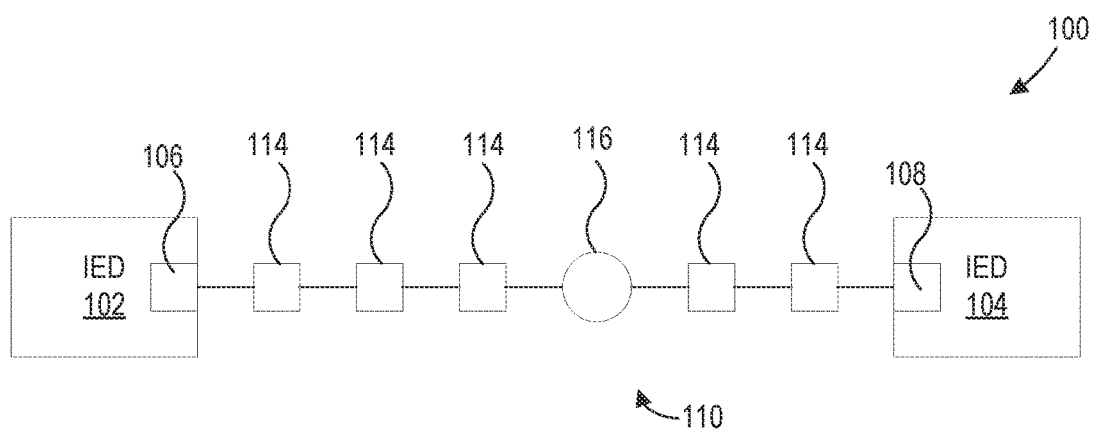
FIG. 1 is a block diagram of a fiber optic communication system according to embodiments of the present disclosure.

Electric power systems are used to generate, transmit, and distribute electric power to loads and serve as an important part of critical infrastructure. Electric power systems include equipment, such as generators, transmission and distribution lines, transformers, capacitor banks, and electrical substations, to provide electrical energy from sources to loads. In some cases, electric power systems and equipment may be monitored and protected by a variety of types of equipment. Such equipment may include sensors to monitor currents, voltages, phases, and other parameters of the electric power system. Such equipment may additionally include circuit breakers (CBs), such as intelligent CBs, to implement protective functions. The CBs may interface with various other devices such as automation systems and intelligent electronic devices (IEDs). To provide relatively fast and reliable transmission of communications between various components of the electric power system, fiber optic communications may be utilized.

As part of a substation communications design, a fiber path "loss budget" is calculated based on predicted losses of components in a data path including fiber, connectors, and splices, plus any passive optical components like splitters and patch panels. This loss budget is based on estimates of loss for the various components and is therefore an estimated path loss to be compared to test data.

Various tests may be employed to determine whether a fiber optic cable was installed properly. During a design phase, loss budgets calculated for each cable run should provide an estimate of the expected loss of the fibers in each cable link to compare to actual test results. During commissioning, the data path loss is tested and measured to confirm that the path delivers adequate power to a receiver to satisfy the sensitivity of the receiver and adequate design margin.

Fiber optic cabling networks may be tested for "polarity" using a visible source so that a technician can confirm that fibers are connected per documented cable diagrams. Then connectors may then be cleaned and inspected manually, and finally path loss is measured using an optical loss test set at the source end and power meter at the receiving end. The commissioning test path loss data is then compared to the design path loss estimates and the receiver sensitivity and signal margin. Test data created by test instruments may have measurement errors and/or process energy differently that the actual devices to be connected to the fiber optic path.

As with many other signal exchange considerations among IEDs, fiber optics transmission (TX) and receiving (RX) power should be measured, tested, and monitored by the IEDs themselves. Additionally, real system values may change over time, such as due to environmental conditions.

A merging unit is a type of IED that samples currents and voltages and then transmits digitized representations back to a relay (another type of IED), such as by using fiber optic communications. The connections between merging units and relays may be located in harsh conditions and may become contaminated, such as by dirt and/or corrosion. This leads to problems because the contaminants can impede the signal and disrupt communication.

Accordingly, it may be desirable to measure, test, and monitor the power of fiber optic signals on fiber optic systems during normal operations on local and integral devices at regular intervals and/or substantially continuously.

The embodiments of the disclosure will be best understood by reference to the drawings. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor do the steps need to be executed only once, unless otherwise specified.

In some cases, well-known features, structures, or operations are not shown or described in detail. Furthermore, the described features, structures, or operations may be combined in any suitable manner in one or more embodiments. It will also be readily understood that the components of the embodiments, as generally described and illustrated in the figures herein, could be arranged and designed in a wide variety of different configurations. For example, throughout this specification, any reference to "one embodiment," "an embodiment," or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Several aspects of the embodiments disclosed herein may be implemented as software modules or components. As used herein, a software module or component may include any type of computer instruction or computer-executable code located within a memory device that is operable in conjunction with appropriate hardware to implement the programmed instructions. A software module or component may, for instance, comprise one or more physical or logical blocks of computer instructions, which may be organized as a routine, program, object, component, data structure, etc., that performs one or more tasks or implements particular abstract data types.

In certain embodiments, a particular software module or component may comprise disparate instructions stored in different locations of a memory device, which together implement the described functionality of the module. Indeed, a module or component may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a non-transitory machine-readable medium having stored thereon instructions that may be used to program a computer or other electronic device to perform processes described herein. The non-transitory machine-readable medium may include, but is not limited to, hard drives, floppy diskettes, optical disks, CD-ROMs, DVD-ROMs, ROMS, RAMs, EPROMs, EEPROMs, magnetic or optical cards, solid-state memory devices, or other types of media/machine-readable media suitable for storing electronic instructions. In some embodiments, the computer or another electronic device may include a processing device such as a microprocessor, microcontroller, logic circuitry, or the like. The processing device may further include one or more special purpose processing devices such as an application specific interface circuit (ASIC), PAL, PLA, PLD, field programmable gate array (FPGA), or any other customizable or programmable device.

FIG. 1 shows a block diagram of a fiber optic communication system 100 according to embodiments of the present disclosure, and may include a first IED 102 (e.g., a merging unit) and a second IED 104 (e.g., a relay) connected by a fiber optic path 110 (e.g., a fiber optic cable run). The first IED 102 may include a transmitter 106 (e.g., a network card) configured to generate an optical signal encoding data and output the optical signal into the fiber optic path 110. The second IED 104 may include a receiver 108 configured to receive the optical signal from the fiber optic path 110 to be decoded by the second IED 104. Optionally, the first IED 102 may also include a receiver and the second IED 104 may additionally include a transmitter 106.

The fiber optic path 110 may include sections of fiber optic cable 112 joined together with connectors 114 (e.g., patch panel connectors) and/or splices 116. An optical signal transmitted through the fiber optic path 110 may experience losses along its length and at each of the connectors 114 and the splice 116. Optionally, additional features may be included in a fiber optic path that may cause power losses, such as passive optical components like splitters and patch panels.

Figure 2:
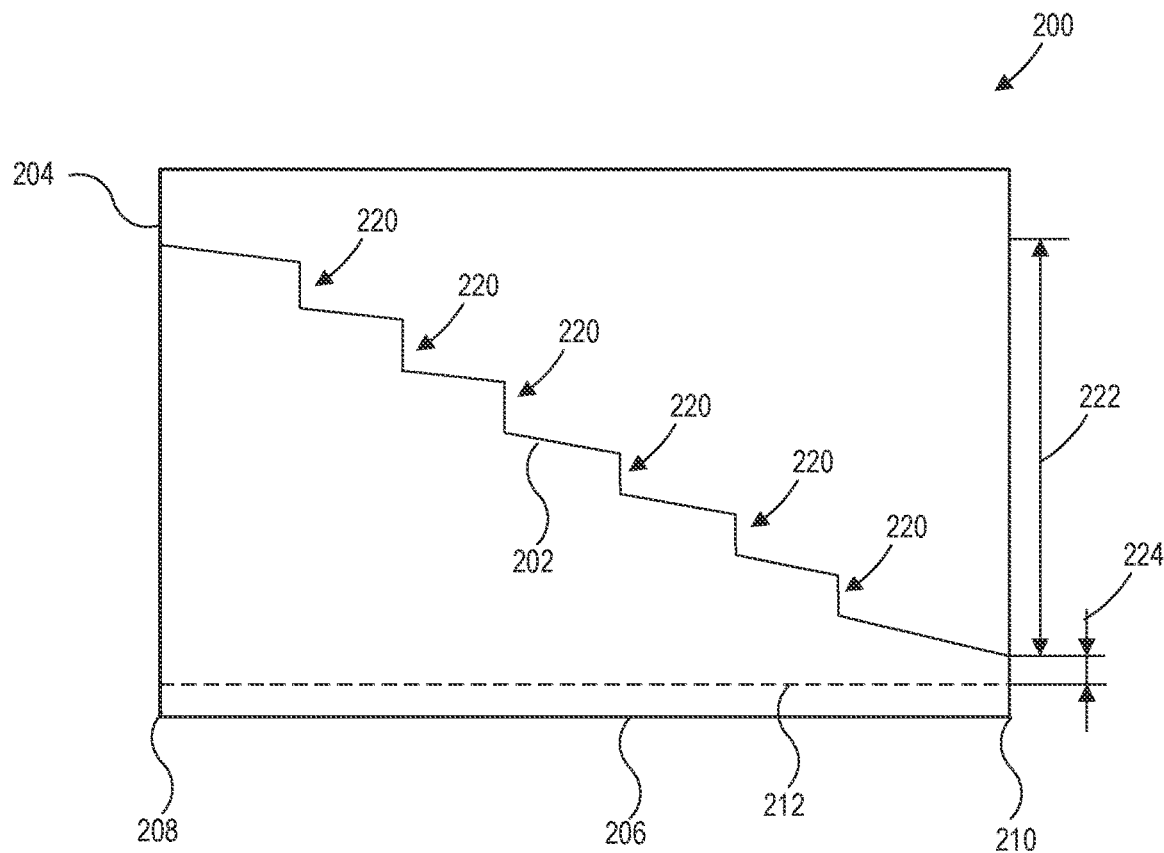
FIG. 2 is a chart depicting the optical signal power of the fiber optic communication system of FIG. 1.

FIG. 2 shows a chart 200 depicting the optical signal power on a decibel scale of an optical signal 202 on a vertical axis 204 versus distance (e.g., location on the fiber optic path) on a horizontal axis 206. A location of transmitter 106 of the first IED 102 of FIG. 1 is shown at a left end location 208 of the horizontal axis 206 and the location of a receiver 108 of the second IED 104 of FIG. 1 is shown at the right end location 210 of the horizontal axis 206. A dashed line 212 indicates a sensitivity limit of the receiver 108 of the second IED 104 (e.g., a minimum power threshold value) below which the optical signal 202 may not be properly received, and encoded data may not be efficiently and/or properly decoded by the second IED 104. Accordingly, it is important to the integrity of the data transmission that the power of the optical signal 202 be greater than the sensitivity limit of the receiver when it reaches the location 210 of the receiver 108 of the second IED 104.

As shown, optical signal 202 may be at a maximum power at the location 208 of transmission from the transmitter 106 of the first IED 102 of FIG. 1. As optical signal 202 travels from location 208 to location 210 along the fiber optic path 110 of FIG. 1, the power of the optical signal may decrease. At locations 220 where sections of fiber optic cable 112 are joined together, such as by the connectors 114 and the splice 116, the power of the optical signal 202 may decrease significantly. The power of the optical signal 202 may be at a minimum at location 210 of the receiver of the second IED 104. The difference 222 between the power of the optical signal 202 at the location 208 of the transmitter of the first IED 102 and the power of the optical signal 202 at the location 210 of the receiver of the second IED 104 is referred to as a "path loss" of the optical signal 202. The difference 224 between the dashed line 212 indicating the sensitivity limit of the receiver of the IED 104 and the power of the optical signal 202 at the location 210 of the receiver of the IED 104 is referred to as the "margin" of the optical signal 202.

Figure 3A:
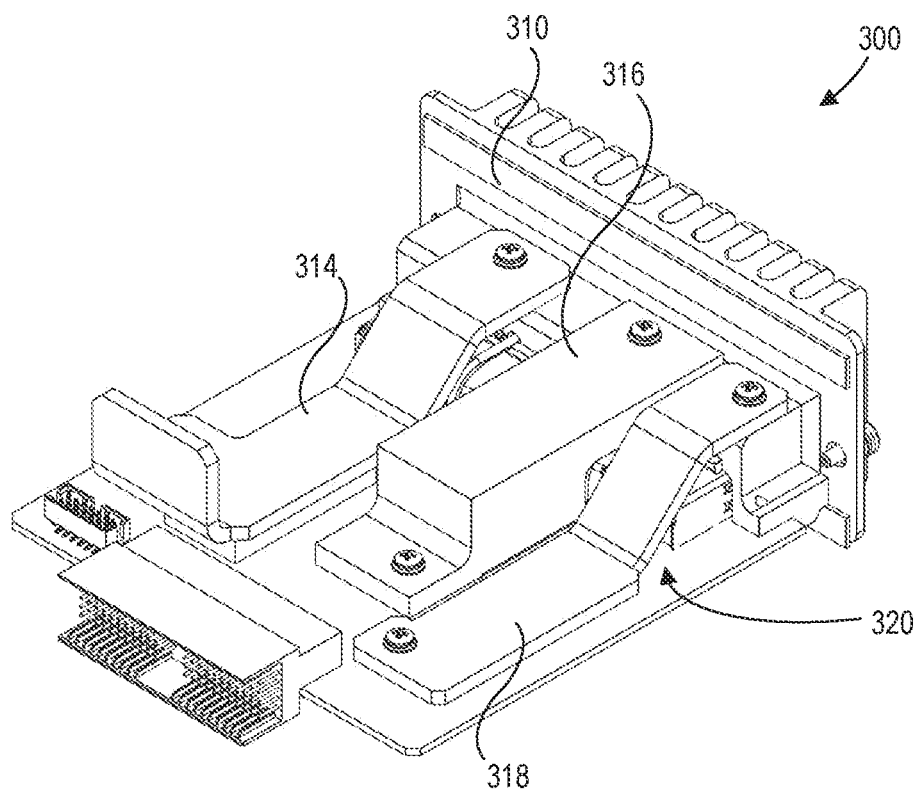
FIG. 3A shows an isometric view of a network card according to an embodiment of the present disclosure.
Figure 3B:
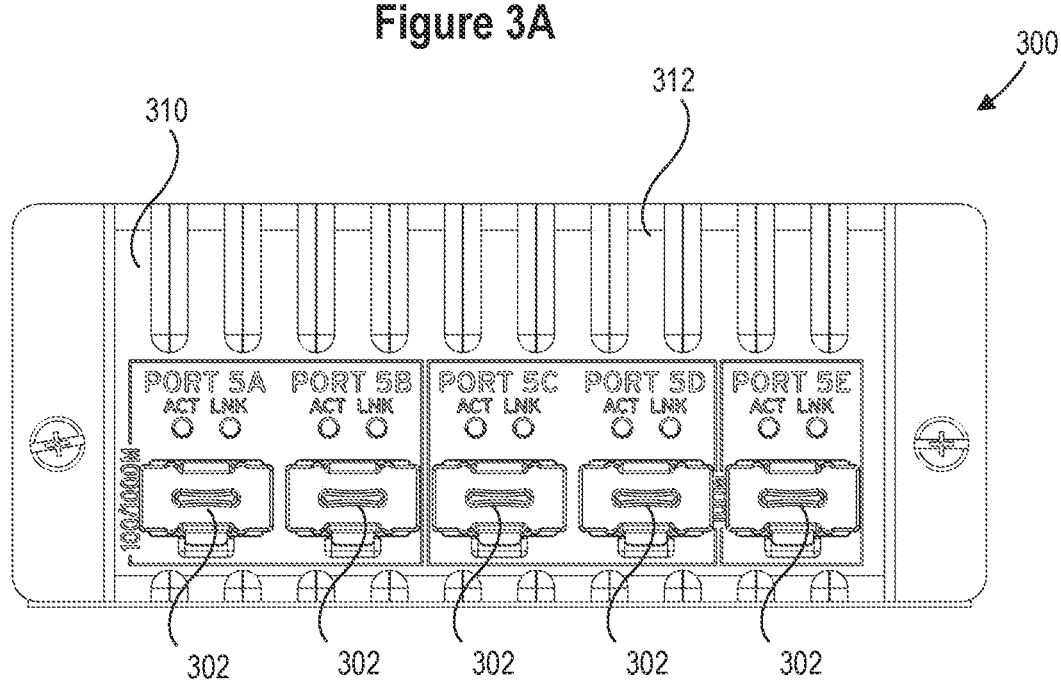
FIG. 3B shows an end view of the network card of FIG. 3A.

FIG. 3A shows an isometric view and FIG. 3B shows an end view of a network card 300 according to an embodiment of the present disclosure. The network card 300 may be utilized as a transmitter and/or receiver in an IED. For example, the network card 300 may be utilized as the transmitter 106 of the first IED 102 and/or the receiver 108 of the second IED 104 shown in FIG. 1.

At one end, the network card 300 may include fiber optic ports 302 (e.g., small form-factor pluggable (SFP) connections) configured to receive end connectors of fiber optic cables. Each of the fiber optic ports 302 may be configured to transmit and/or receive optical signals encoding data. At another end, the network card 300 may include a connector 304 configured to couple with an IED and transmit electrical signals between the network card 300 and an IED.

The network card 300 may include a circuit board 306 having various components mounted thereon such as semiconductor chips for processing and/or storing data (e.g., processors and/or memory) and circuitry connecting various components of the network card 300.

The network card 300 may also be equipped with a passive heat management system comprising a primary heat sink 310 surrounding the fiber optic ports 302. The primary heat sink 310 may be comprised of a material that has a relatively high heat conductivity, such as a metal that may facilitate the transfer of heat through the primary heat sink 310. The primary heat sink 310 may additionally include a plurality of fins 312 that may be located at an end of the network card 300 that is exposed to ambient conditions outside of an IED when mounted in an IED. The fins 312 may facilitate the dissipation of heat to an external ambient environment. The network card 300 may additionally include one or more secondary heat sinks 314, 316, 318. The secondary heat sinks 314, 316, 318 may have a first end that is located in direct contact with or at least in close proximity to a heat producing component, such as one or more semiconductor chip. The secondary heat sinks 314, 316, 318 may have a second end that is in direct contact with the primary heat sink 310. The secondary heat sinks 314, 316, 318 may be comprised of a material with relatively high heat conductivity, such as a metal. Accordingly, the secondary heat sinks 314, 316, 318 may transfer heat from heat producing components of the network card 300 to the primary heat sink 310 where the heat may be dissipated into the ambient environment, such as via the fins 312. This passive heat management system may provide cooling of the network card 300 in a robust manner without requiring active cooling components (e.g., a fan) that might be subject to failure that leads to overheating.

The network card 300 may include a fiber optic supervisory system 320 that may include a power monitoring subsystem to measure the power of optical signals at the location of transmission and/or at the location of receiving during data transmission operations with optical signals encoding data. The fiber optic supervisory system 320 may additionally include a temperature monitoring subsystem to measure a temperature of the network card 300.

Figure 4:
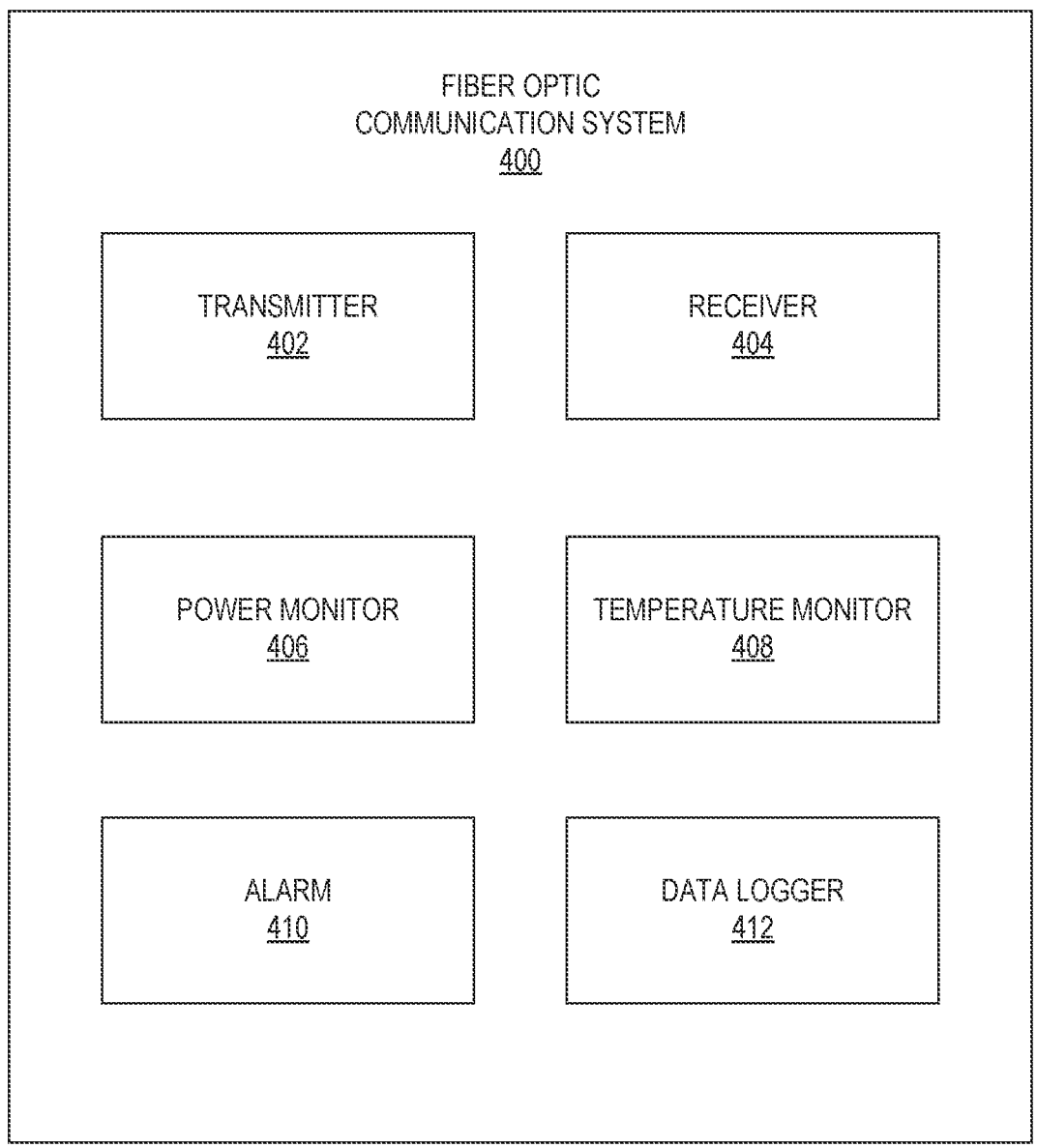
FIG. 4 shows a block diagram of a fiber optic communication system according to embodiments of the present disclosure.

FIG. 4 shows a block diagram of a fiber optic communication system 400 according to an embodiment of the present disclosure. The fiber optic communication system 400 may comprise a transmitting subsystem 402, a receiving subsystem 404, a power monitoring subsystem 406, a temperature monitoring subsystem 408, an alarm subsystem 410, and a data logging subsystem 412.

The transmitting subsystem 402 may be configured to transmit optical signals encoding data on an optical path (e.g., a fiber optic cable). The receiving subsystem 404 may be configured to receive the optical signals transmitted by the transmitting subsystem 402 and decode the data encoded in the optical signal. For example, the transmitting subsystem 402 may be a network card located in an IED of an electric power system. Likewise, the receiving subsystem 404 may be a network card located in another IED of the electric power system.

It is common for the optical signal levels on an optical path to change in the field due to damage, dirt, and environmental effects, such as corrosion on metal casings. In various embodiments consistent with the present disclosure, IEDs or other components monitor and communicate optical signal power levels and may alarm and/or take corrective action when the optical signal level changes. Similarly, optical signal strength of digital communication paths between IEDs may be monitored in sensitive applications, such as electric power systems. Embodiments of the present disclosure may also be deployed in active interposing devices such as media converters and network switches and routers.

The power monitoring subsystem 406 may be utilized to monitor the integrity of the optical signal. To monitor the integrity of the optical signal at the receiving subsystem 404, the power monitoring subsystem 406 may be configured to measure a power of the optical signal at the receiving subsystem 404 during data-receiving operations. The power monitoring subsystem 406 may be located in or on the receiving subsystem 404, such that measurements of the optical signal may take place where the optical signal is received. For example, a portion of, or all of, the power monitoring subsystem 406 may be integrated with a network card, a switch, and/or a router.

The power monitoring subsystem 406 may be configured to compare the measured power of the optical signal at the receiving subsystem 404 to a minimum power threshold value. If the power monitoring subsystem 406 determines that the power of the optical signal is below the minimum power threshold value, the alarm subsystem 410 may generate an alarm indicating low signal power at the receiving subsystem 404. The alarm may alert personnel to a system anomaly so that corrective action may be taken. For example, the power monitoring subsystem 406 may generate a signal to failover a faulty port to a backup port.

The power monitoring subsystem 406 may be further configured to determine when the power of the optical signal exceeds a maximum threshold value at the receiving subsystem 404. In addition to signal degradation creating problems, active components in an optical path may boost the signal to levels that saturate and/or overwhelm the receiving subsystem 404 such that it does not function properly. When the power monitoring subsystem 406 determines that the power of the optical signal exceeds the maximum threshold value, the alarm subsystem 410 may generate an alarm indicating high signal power at the receiving subsystem 404. The alarm may alert personnel to a system anomaly so that corrective action may be taken.

The power monitoring subsystem 406 may also be configured to measure a power of the optical signal at the transmitting subsystem 402 during data transmitting operations. For example, a portion of, or all of, the power monitoring subsystem 406 may be located in or on the receiving subsystem 404, such that measurements of the power of the optical signal can be taken right at the point of transmission.

The power monitoring subsystem 406 may be configured to compare the measured power of the optical signal at the transmitting subsystem 402 to a minimum power threshold value. If the power monitoring subsystem 406 determines that the power of the optical signal is below the minimum power threshold value, the alarm subsystem 410 may generate an alarm indicating low signal power at the transmitting subsystem 402. The alarm may alert personnel to a system anomaly so that corrective action may be taken.

The power monitoring subsystem 406 may also be configured to compare the measured power of the optical signal at the transmitting subsystem 402 to the measured power of the optical signal at the receiving subsystem 404. If the power monitoring subsystem 406 determines that the difference between the power of the optical signal at the transmitting subsystem 402 and the power of the optical signal at the receiving subsystem 404 is below a threshold loss value, the alarm subsystem 410 may generate an alarm indicating high optical signal loss. The alarm may alert personnel to a system anomaly so that corrective action may be taken.

High temperatures are often an early indicator of problems in fiber optic communication systems. Accordingly, a temperature monitoring subsystem 408 may be configured to measure temperatures at various locations of the fiber optic communication system.

To identify heat issues at the receiving subsystem 404, the temperature monitoring subsystem 408 may be configured to measure a temperature of the receiving subsystem 404 and determine when the measured temperature is above a maximum temperature threshold value. When the temperature monitoring subsystem 408 determines that the measured temperature is above the maximum temperature threshold value, the alarm subsystem 410 may generate an alarm indicating a high temperature at the receiving subsystem 404. The alarm may alert personnel to a system anomaly so that corrective action may be taken.

Likewise, to identify heat issues at the transmitting subsystem 402, the temperature monitoring subsystem 408 may also be configured to measure a temperature of the transmitting subsystem 402 and determine when the measured temperature is above a maximum temperature threshold value. When the temperature monitoring subsystem 408 determines that the measured temperature is above the maximum temperature threshold value, the alarm subsystem 410 may generate an alarm indicating a high temperature at the transmitting subsystem 402. The alarm may alert personnel to a system anomaly so that corrective action may be taken.

The power monitoring subsystem 406 and the temperature monitoring subsystem 408 may operate on a substantially continuous basis, taking regular measurements of the fiber optic communication system 400.

To track the monitored temperatures and power levels, the data logging subsystem 412 may receive the measurements from the power monitoring subsystem 406 and the temperature monitoring subsystem 408. The data logging subsystem 412 may then log optical signal power levels for historical light delivery trends. The data logging subsystem 412 may also log temperature levels for system performance diagnostics and to determine temperature anomalies that may indicate a problem. The data logging subsystem 412 may be configured to log the optical signal power levels and the temperature levels on a daily, monthly, and annual basis.

In embodiments of the present disclosure, fiber optic devices and systems may regularly and/or continuously monitor during commissioning. In some embodiments, monitoring may continue in-service supervision. Self-announce failure detection and alarm features may notify operators of changes to fiber optic power measurements, and in some embodiments, systems may react to signal power level changes.

Embodiments of the present disclosure may calculate fiber optic signal power differentials, provide saturation detection and prevention, and monitor temperature of the system components.

Fiber optic signal power monitoring systems according to embodiments of the present disclosure may be resident in the IEDs themselves, in the Ethernet switches, and/or in a centralized device collecting measured values from the transmitting and receiving IEDs as well as active fiber optic devices and switches in the data path(s).

Fiber optic signal power monitoring systems according to embodiments of the present disclosure may be configured to monitor the real-time power signal level of light through a path using the differential TX level from the source and RX level at the receiver sensors. Differential and saturation calculations may be used to provide an early warning of the poor health of instruments, components, or the failure of a path. The fiber optic signal power monitoring system may calculate and log signal levels on a daily, monthly, seasonal, and/or annual basis for historical light delivery trends. In this way, the fiber optic signal power monitoring system provides more visibility into the application, which helps users in predicting and detecting probable failure nodes. For example, the trends may reveal that a fiber connector needs cleaning or that a splice needs replacing. Additionally, the system can reveal trends that may indicate where changes to the system should be made.

While specific embodiments and applications of the disclosure have been illustrated and described, it is to be understood that the disclosure is not limited to the precise configurations and components disclosed herein. Accordingly, many changes may be made to the details of the above-described embodiments without departing from the underlying principles of this disclosure. The scope of the present invention should, therefore, be determined only by the following claims.

What is claimed is:

1. An intelligent electronic device (IED) to monitor an electric power system, comprising:
   a receiving subsystem to receive an optical signal encoding data comprising at least one parameter of the electric power system after the optical signal passes through a plurality of optical connectors distributed in the electric power system;
   an optical power monitoring subsystem to:
      measure a power of the optical signal at the receiving subsystem during data receiving operations;
      compare the power of the optical signal to a minimum power threshold value; and
      determine when the power of the optical signal is below the minimum power threshold value at least partially due to dissipation of optical energy from the plurality of optical connectors distributed in an electric substation of the electric power system; and
   an alarm subsystem to:
      generate an alarm when the optical signal is below the minimum power threshold value.

2. The IED of claim 1, wherein the optical power monitoring subsystem is further configured to determine that the power of the optical signal exceeds a maximum threshold value, and the alarm subsystem is further configured to generate an alarm when the optical signal exceeds the maximum threshold value.

3. The IED of claim 1, further comprising:
   a temperature monitoring subsystem configured to measure a temperature of the receiving subsystem and determine when the measured temperature is above a maximum temperature threshold value;
   wherein the alarm subsystem is further configured to generate an alarm when the measured temperature is above the maximum temperature threshold value.

4. The IED of claim 1, wherein the optical power monitoring subsystem operates on a substantially continuous basis.

5. The IED of claim 4, further comprising a data logging subsystem configured to log the power of the optical signal.

6. The IED of claim 5, wherein the data logging subsystem is configured to log temperature measurements.

7. A method of monitoring a portion of an electric power system using an intelligent electronic device, the method comprising:
   measuring a power of an optical signal encoding data comprising at least one parameter of the electric power system after the optical signal passes through a plurality of optical connectors distributed in the electric power system at a receiving subsystem;
   measuring a power of the optical signal at a transmitting subsystem;
   determining a difference between the power of the optical signal at the receiving subsystem and the power of the optical signal at the transmitting subsystem, the difference at least partially due to dissipation of optical energy from the plurality of optical connectors distributed in an electric substation of the electric power system;
   comparing the difference to a threshold loss value; and
   generating an alarm when the difference exceeds the threshold loss value.

8. The method of claim 7, further comprising:
   measuring a temperature of the receiving subsystem;
   comparing the measured temperature of the receiving subsystem to a maximum temperature threshold value; and
   generating an alarm when the measured temperature of the receiving subsystem is above the maximum temperature threshold value.

9. The method of claim 7, further comprising measuring the power of the optical signal at the receiving subsystem on a substantially continuous basis.

10. The method of claim 9, further comprising logging the measured power of the optical signal at the receiving subsystem.

11. The method of claim 10, further comprising logging the measured power of the optical signal at the receiving subsystem on a daily, monthly, and annual basis.

12. The IED of claim 1, wherein the IED is configured to operate during commissioning of the electric power system.

13. The IED of claim 1, wherein the at least one parameter of the electric power system comprises one of a current and a voltage.

14. The method of claim 7, further comprising:
  comparing the measured power of the optical signal at the receiving subsystem with a maximum power threshold value; and
  generating an alarm when the measured power of the optical signal at the receiving subsystem is above the maximum power threshold value.

* * * * *